July 25, 1967  A. J. FRISTOT  3,332,113
METHOD FOR MOLDING ARTICLES MADE OF ELEMENTS
ASSEMBLED IN TIERS AND MOLD FOR
EXECUTING SAID METHOD
Filed Feb. 12, 1965  5 Sheets-Sheet 1

INVENTOR
ALFRED JEAN FRISTOT
BY Irwin S. Thompson
ATTORNEY

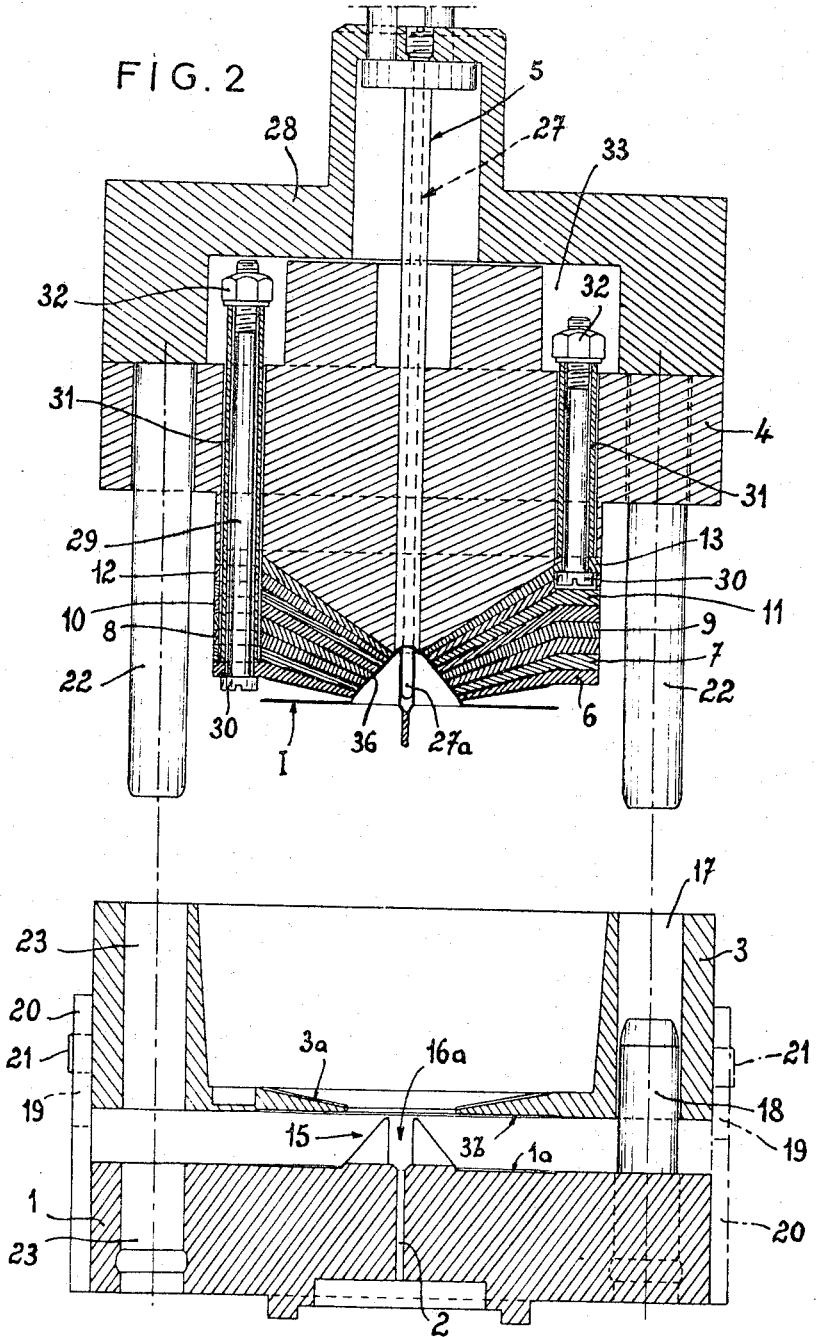

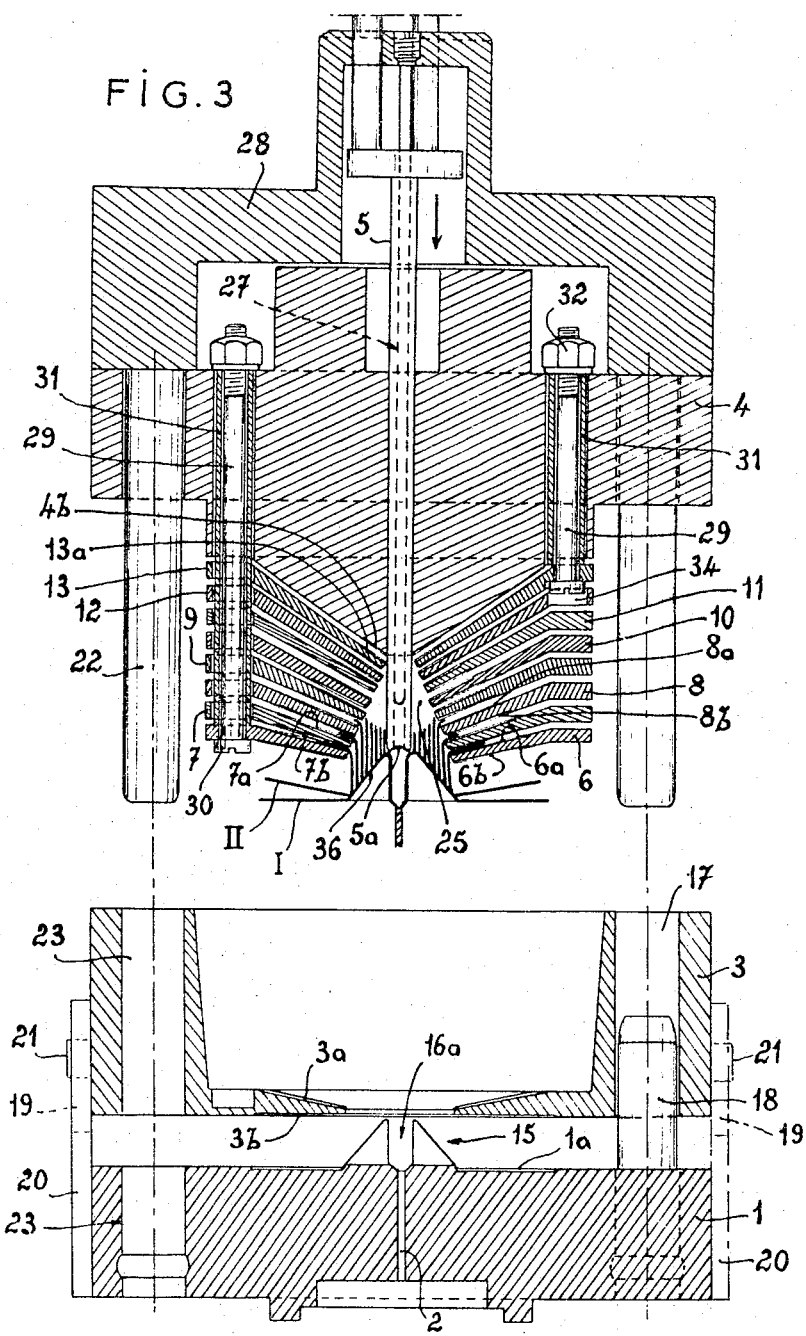

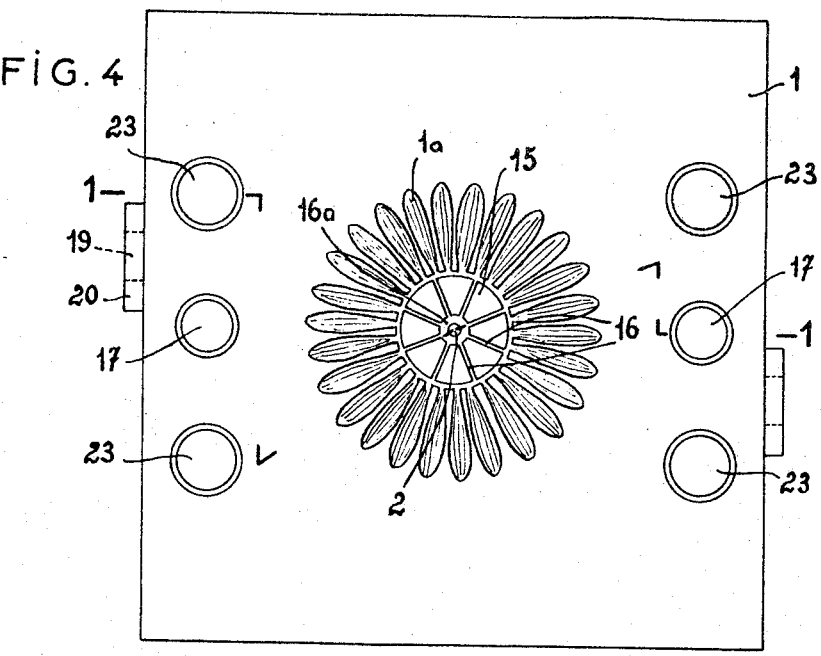
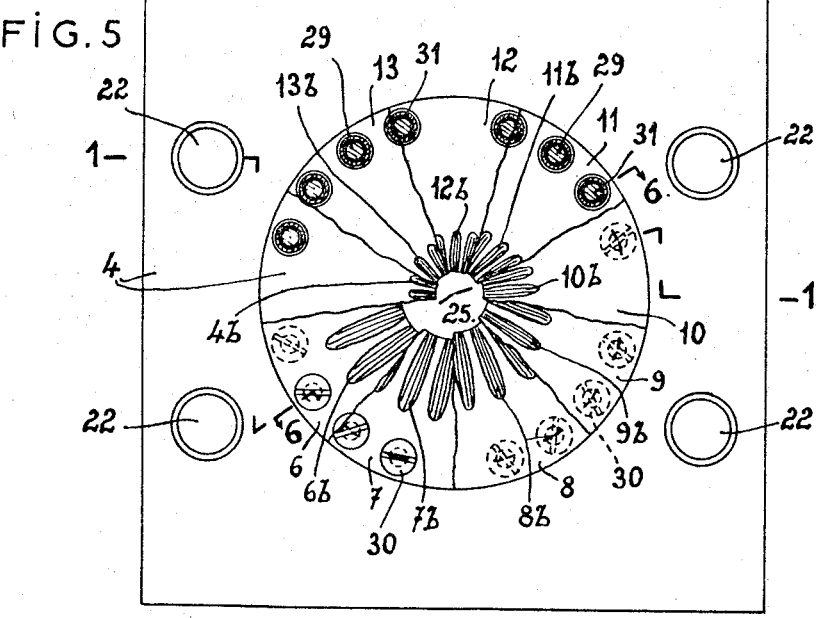

July 25, 1967 A. J. FRISTOT 3,332,113
METHOD FOR MOLDING ARTICLES MADE OF ELEMENTS
ASSEMBLED IN TIERS AND MOLD FOR
EXECUTING SAID METHOD
Filed Feb. 12, 1965 5 Sheets-Sheet 5

INVENTOR
ALFRED JEAN FRISTOT
BY Irwin S. Thompson
ATTORNEY

United States Patent Office 3,332,113
Patented July 25, 1967

3,332,113
METHOD FOR MOLDING ARTICLES MADE OF ELEMENTS ASSEMBLED IN TIERS AND MOLD FOR EXECUTING SAID METHOD
Alfred Jean Fristot, Fontaines-sur-Saone, France
Filed Feb. 12, 1965, Ser. No. 432,108
Claims priority, application France, Apr. 8, 1964, 44,662, Patent 1,400,467
7 Claims. (Cl. 18—42)

ABSTRACT OF THE DISCLOSURE

A mold comprises a fixed plate through which injection is effected and at least one movable plate comprising a pile of superposed truncated conical plates individually slidable on guides and forming elemental molds between them. The elemental molds communicate with a central space and can be opened one by one starting with the one farthest from the injection.

---

Figure 1:
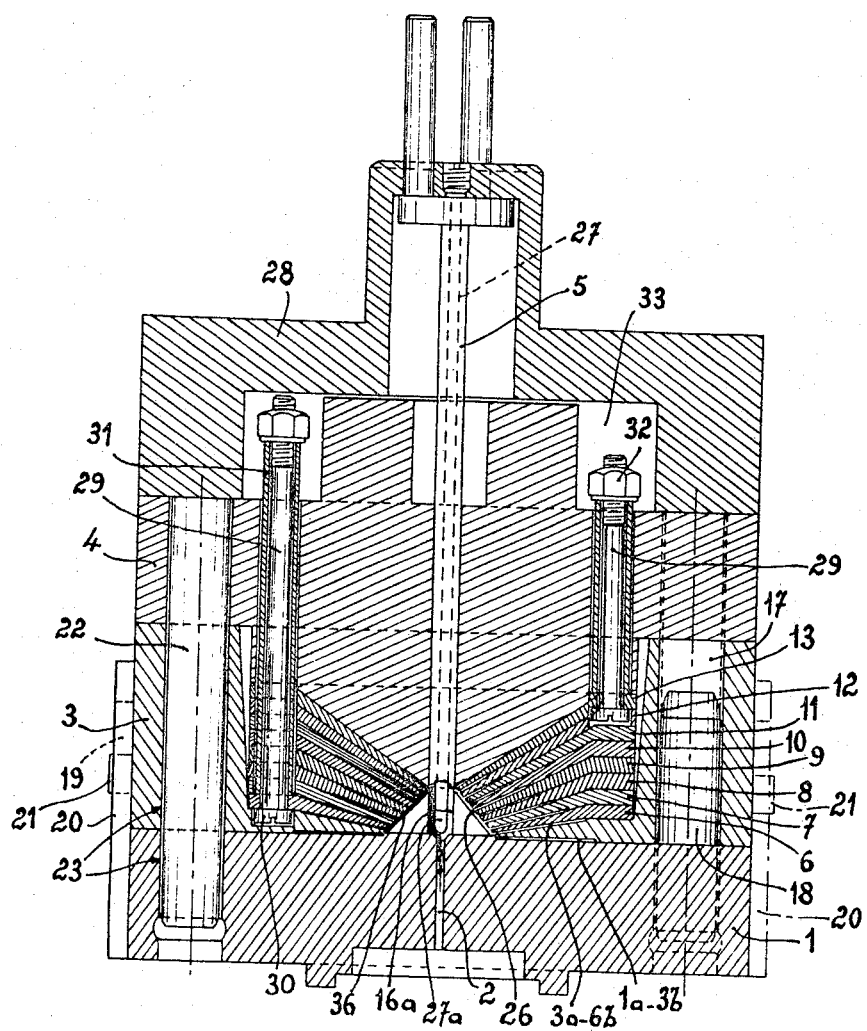

Numerous articles exist which include elements assembled in tiers. This is the case in particular, but not exclusively, of certain artificial flowers, the petals of which forming the corolla are arranged in superposed rows or tiers round the pistil.

In order to obtain such articles made of injected plastic material, it has always been necessary hitherto, except in the case of articles of a very small size, to start from elementary sections molded independently and assembled subsequently, which leads to an operation which is not only long and intricate but also expensive while furthermore the result depends on the more or less considerable skill of the operator.

My invention relates to a method for injection molding which allows obtaining such articles directly as a unit.

My improved method is characterized chiefly by the fact that the different tiers of the article to be obtained are formed in superposed individual molds forming a stack and adapted to move with reference to each other upon spacing thereof along the axis of the stack and consequent opening of the molds; this opening of the molds is executed in succession from one tier to the next so as to strip in succession the different and the ejection of the molded sections in the tiers which are already opened begins while molds in the following tiers are gradually opened in succession.

For the execution of said method, my improved mold is characterized chiefly by the fact that it includes at least one plate adapted to move axially with reference to the stationary plate through which the injection is performed, said movable plate being constituted itself by a stack of a plurality of axially movable dished members, provided with radial cut recesses and with a central opening so that they may each form with the adjacent dished member, an elementary mold communicating with the injection port which is preferably common for all the elementary molds, the different dished members being slidingly fitted on rods extending in parallelism with the central axis, while the elementary molds open in their order of succession, beginning with the mold which is located on the side facing away from the injection port, the opening strokes being limited by stop systems.

The outline of the above-mentioned movable tiers may be selected as desired and be flat, frusto-conical, convex, concave or assume any desired shape, whether geometrical or otherwise. Their number may also vary according to the requirements of the article to be obtained.

The ejection of the molded article is performed through the central opening of said stack of dished members, with a transient deformation of the injected article, by an axial thrust exerted on it by an ejector, said axial thrust producing in its turn the opening of the different individual molds through a gradual spacing apart of the different component dished members considered in succession and this leads consequently to the stripping first of the elements of the first row or tiers located near the ejector and consequently said elements are released first and are shifted outwardly while a similar release is provided in succession for the other rows or tiers up to the last of them.

My improved mold including a multiplicity of movable tiers may be closed directly by the stationary plate through which the injection is performed; however, it is more advantageous to associate said mold with another, intermediate plate which is also movable axially with reference both to the movable and to the stationary plate, said intermediate plate forming itself if desired one or more movable tiers designed in the manner disclosed hereinabove.

Figure 6:
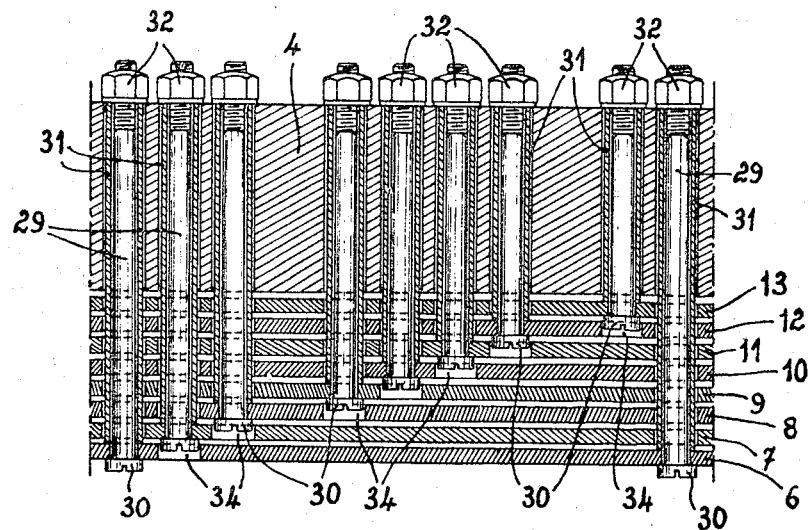
Figure 7:
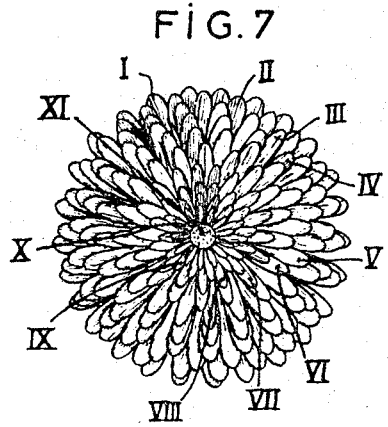
Figure 8:
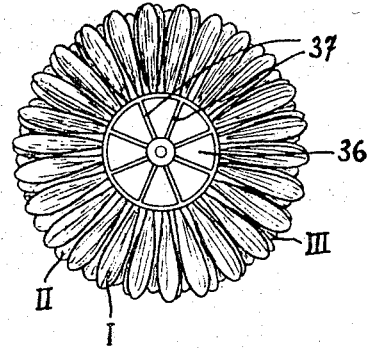

My invention will be readily understood upon reading of the following disclosure, reference being made to the accompanying drawings given solely by way of exemplification and relating to a mold including nine movable tiers associated with a further single tier constituted by an intermediate plate, said mold being assumed to serve by way of example for the molding of a flower, say a daisy of which the corolla includes ten rows of petals. In said drawings:

FIG. 1 is a general cross-sectional view of a mold, the section line being shown at 1—1 in FIGS. 4 and 5, said FIG. 1 illustrating the mold in its closed position, the right hand side of said figure showing the mold before injection and the left hand side after injection, FIG. 2 is a similar view corresponding to the open position of the mold after injection of the flower, FIG. 3 is an also similar view corresponding to the period of ejection of the molded flower, FIG. 4 is a plan view, as seen from above, of the stationary plate, FIG. 5 is a plan view from underneath of the stack of dished members, said dished members being partly torn off so that all of them may partly appear to view, FIG. 6 is a developed cross-section, along line 6—6 of FIG. 5, of the stack of dished members forming the movable plate, FIGS. 7 and 8 are plan views, as seen respectively from above and from below, of the flower obtained in the mold.

The mold illustrated includes chiefly:

A stationary plate 1 provided with a channel 2 through which the plastic material is injected into the mold, An intermediate plate 3 adapted to move axially with reference to the above-mentioned stationary plate 1, and A movable plate 4 through which the ejector 5 may slide and to which are secured the dished members 6, 7, 8, 9, 10, 11, 12 and 13 (the number of which is equal to eight in the case illustrated).

The stationary plate 1 includes a conical nose 15 at the center of which opens the injection channel 2 feeding the plastic material. Said conical nose is provided with radial slots 16 leading to a cylindrical bore 16a at the center of which the injection channel 2 opens.

The intermediate plate 3 is guided with reference to the stationary plate 1 by the two bores 17 sliding over two tubular sections 18 rigid with the stationary plate 1. The opening of the above-mentioned plate 3 with reference to the plate 1 is limited by the elongated ports 19 formed in the lugs 20 and engaged by the projections 21.

The upper movable plate 4 is guided by four uprights 22 engaging and sliding inside the bores 23 registering therewith and formed in the intermediate plate 3 and in the stationary plate 1.

The surface of the stationary plate 1 forms with the lower surface of the movable plate 3 a first individual mold defined by radial cuts shown respectively at 1a and 3b and opening towards the location of the axis of the mold.

The upper surface of the movable plate 3 is frusto-conical and its conicity matches the lower surface of the first dished member 6 carried by the plate 4. The two surfaces considered thus engage each other intimately and form a second individual mold defined by the corresponding radial cuts 3a and 6b.

The arrangement is the same for the successive individual molds formed between the dished members 6–7, 7–8, 8–9, 9–10, 10–11, 11–12 and 12–13.

The central downwardly projecting section of the movable plate 4 shows a conicity matching that of the upper surface of the last dished member 13 and forms with the latter a last individual mold defined by the radial cuts designated by 13a and 4b respectively.

It should be remarked that said conical dished members 6, 7 . . . 13 do not show a uniform thickness, and in fact their thickness decreases gradually from the center outwardly so that the conicity of the lower surface of each of them is smaller than the conicity of its upper surface.

It should also be remarked that the conicity of the lower surface of each of the dished members matches the conicity of the upper surface of the adjacent dished member facing it.

Again it should be remarked that each of said dished members is provided with a central port 25 and that the diameter of said ports decreases from the dished member 6 up to the last dished member 13 so as to define, when all these dished members are superposed in contacting relationship with one another, a hollow conical chamber the outline of which matches that of the conical nose 15 on the stationary plate 1, while however an empty annular gap 26 is formed round said nose, which gap communicates on the one hand with the output ends of the radial slots 16 in said nose and on the other hand with the inner open ends of the radial cuts 6a–6b, 7a–7b, 8a–8b, 13a–4b.

The lower end of the ejector 5 closes the upper end of said empty gap and it may also be provided with a suitably cut surface 5a. Said tubular ejector is guided by a rod 27 extending inside it throughout its height and secured rigidly to a cover 28 fitted on the plate 4. For the closed position of the mold, the lower end 27a of said rod projects beyond the ejector and enters the cylindrical chamber 16a formed in the nose 15 of the stationary plate 1.

The dished members 6, 7, 8 . . . 13, stacked in superposition, are slidingly connected with the plate 4 by the following means: each of said dished members includes at its periphery, a flat circular flange through which pass the shanks of two bolts 29 located at 180° from each other, the above-mentioned flange of each dished member being held between the heads 30 of said bolts and a tubular stay 31 which latter is held in its turn by a nut 32 screwed over the threaded ends of the corresponding bolt shank.

Said tubular stays may slide freely inside corresponding bores formed in the movable plate 4 and the above-mentioned locking nuts 32 engage the upper bearing surface of said plate 4 and may rise above it inside a recess 33 formed in the cover 28.

The shanks of the bolts 29 carrying the dished member 6 pass freely through all the other dished members. The same is the case for the shanks of the bolts of the dished member 7 engaging all the dish-shaped members, starting from the next dished member 8 up to and including the last dished member 13 and so on for the bolts carrying the other dished members.

The heads 30 of the bolts carrying any dished member are housed inside recesses 34 formed in the dished member located immediately underneath the dished member considered.

Lastly and as illustrated more particularly in FIG. 6, the shanks of the bolts 29 carried by each dished member and also the cooperating stays 31 have different lengths, depending on the tiers corresponding to the dished member with which they are connected. Said lengths are such that each dished member may move away from the dished member following it and from that preceding it by a predetermined value limited by the engagement between the nuts 32 and the upper surface of the plate 4. The depth of the recess 33 in the cover 38 is sufficient for it to allow the free upward projection of said shanks and of their nuts when the mold is in its closed position, that is when all the dished members intimately engage one another.

It will now be assumed that the mold described is intended for the molding of the flower illustrated in FIGS. 7 and 8, including ten superposed rows of petals I, II, III . . . X round the central pistil XI; its operation is as follows:

The mold being closed, as shown in FIG. 1, plastic material is injected into the channel 2. Said plastic material progresses in the radial slots 16, fills the annular gap 26 and feeds thus, out of said annular gap, the individual molds in the different tiers.

The mold 1a–3b forms the row of petals I, the mold 3a–6b the row II, the mold 6a-7b the row III and so on up to the row X which is formed in the mold 13a–4b including the pistil which is obtained by the recess 5a cut at the end of the ejector 5.

These different rows of petals form thus, with the pistil, a homogeneous unit obtained by a single molding operation, the different petals of the different rows being all attached to the inverted conical cup 36 (FIGS. 3 and 8) which is obtained in the gap 26 and which is rendered indeformable by the fins 37 cast in the slots 16.

After the plastic material has been allowed to cool to a sufficient extent inside the mold, the latter opens, which results as illustrated in FIG. 2 in a spacing apart, on the one hand, of the plate 3 with reference to the plate 1 to an extent limited by the length of the elongated ports 19 and, on the other hand, of the plate 4 with reference to the plate 3, which latter spacing is however more considerable and is comparativey larger than between the plates 3 and 1.

During this first operation, the row of petals I has been stripped and said petals, which are of a very yielding character, are bent transiently downwardly as they pass through the central opening in the plate 3, said petals being carried along with the cup 36 to which they are attached and which follows the movement of the plate 4.

During the second stage of the lifting or stripping movement (illustrated in FIG. 3), the ejector 5 is pushed down in the direction of the arrow and the thrust exerted by the actual ejector on the molded article, that is in the case considered on the flower illustrated in FIG. 7, produces the opening of the movable tiers of the plate 4.

The ejector urging the flower through its pistil XI, shifts the whole stack of dished members, beginning with the dished member 13 of the plate 4 to the extent allowed by the nuts 32 engaging the shanks of the bolts 29. The elementary mold 13a–4b opens thus and releases the petals in the row X.

The ejector continues then its downward movement without the dished member 13 being capable of following its movement so that the dished member 12 is carried along in its turn and moves away thus from the dished member 13 to the extent allowed by the clearance defined by the nuts 32. The elementary mold 12a–13b is thus opened and releases the petals of the row IX. At the same time, the whole flower is shifted downwardly by an amount corresponding to the spacing between the members 12 and 13 so that the petals of the row X may begin sliding downwardly while bending and closing transiently as allowed by their yieldingness.

The ejector continues its downward movement and the molds 11a–12b and then 10a–11b, 9a–10b, 8a–9b, 7a–8b and lastly 6a–7b open in succession and so on gradually from one elementary mold to the next as already disclosed for the first elementary molds 13a–4b and 12a–13b and at the same time the rows of petals slide gradually inside the mold while closing over their center as soon as they have been lifted, as illustrated in FIG. 3.

At the end of the downward stroke of the ejector 5, the flower has been completely released and lies outside the mold after it has moved through the intermediate space extending between the dished member 6 and the plate 3.

As soon as the flower has been released with reference to the dished member 6, its rows of petals expand and resume their original relative position.

In the preceding disclosure, it has been assumed that the general axis of the mold is vertical, but obviously said axis may extend as well horizontally or along any desired slope.

Lastly, in a more general manner, my invention is by no means limited to the sole embodiment described and illustrated by way of example and it covers in contradistinction all the modifications thereof falling within the scope of the accompanying claims, whether in the case of an artificial flower or of any other article and whatever may be number and shape of the movable tiers.

What I claim is:

1. A mold for molding complex articles made of plastic material and including a stack of superposed sections arranged in tiers, comprising a first stationary plate provided with an injection port, a second plate provided with a channel registering with the injection port, guiding means along which the second plate is adapted to move towards the first plate along a line parallel with said channel to enter transiently an injection position, a plurality of superposed members carried by the second plate in stack formation on the side facing the first plate and adapted to slide with reference to the latter along a line parallel with the channel into a nested position with reference to each other and to the first plate, any couple of successive members including the movable plate defining between them in their nested position closed recesses opening into a central port registering with the channel, to provide a passage for the injected material out of the injection port into said closed recesses, means controlling a limited sliding of the superposed members away from each other in succession starting with that furthest away from the injection port out of their relative nested position to release the sections molded therein when the plates are spaced apart and means adapted to urge the sections of the article molded in the successive recesses out of said recesses, starting with the recesses between the second plate and adjacent member.

2. A mold for molding complex articles made of plastic material and including a stack of superposed sections arranged in tiers, comprising a first stationary plate provided with an injection port, a second plate provided with a channel registering with the injection port, guiding means along which the second plate is adapted to move towards the first plate along a line parallel with said channel to enter transiently an injection position, a plurality of superposed dished members carried by the second plate in stack formation on the side facing the first plate and adapted to slide with reference to the latter along a line parallel with the channel into a nested position with reference to each other and to the first plate, any couple of successive members including the movable plate defining between them in their nested position radial closed recesses opening into a central port registering with the channel, to provide a passage for the injected material out of the injection port into said closed recesses, means controlling a limited sliding of the dished members away from each other in succession starting with that furthest away from the injection port out of their relative nested position to release the sections molded therein when the plates are spaced apart and means adapted to urge the sections of the article molded in the successive recesses out of said recesses, starting with the recesses between the second plate and adjacent member.

3. A mold for molding complex articles made of plastic material and including a stack of superposed sections arranged in tiers, comprising a first stationary plate provided with an injection port, a second plate provided with a channel registering with the injection port, guiding means along which the second plate is adapted to move towards the first plate along a line parallel with said channel to enter transiently an injection position, a plurality of superposed members carried by the second plate in stack formation on the side facing the first plate and adapted to slide with reference to the latter along a line parallel with the channel into a nested position with reference to each other and to the first plate, any couple of successive members including the movable plate defining between them in their nested position closed recesses opening into a central port registering with the channel, to provide a passage for the injected material out of the injection port into said closed recesses, means controlling a limited sliding of the superposed members away from each other in succession starting with that furthest away from the injection port out of their relative nested position to release the sections molded therein when the plates are spaced apart and an ejector slidably engaging the channel in the second plate and adapted to urge the sections of the article molded in the successive recesses out of said recesses, starting with the recesses between the second plate and adjacent member.

4. A mold for molding complex articles made of plastic material and including a stack of superposed sections arranged in tiers, comprising a first stationary plate provided with an injection port, a second plate provided with a channel registering with the injection port, guiding means along which the second plate is adapted to move towards the first plate along a line parallel with said channel to enter transiently an injection position, a plurality of superposed members carried by the second plate in stack formation on the side facing the first plate and adapted to slide with reference to the latter along a line parallel with the channel into a nested position with reference to each other and to the first plate, any couple of successive members including the movable plate defining between them in their nested position closed recesses opening into a central port registering with the channel, to provide a passage for the injected material out of the injection port into said closed recesses, an intermediate centrally open plate adapted to move between the first and second plate in a direction parallel with the channel and including a transverse element facing the stack of superposed members and adapted to move into a nested position with reference to the nearest of the superposed members to define therewith further recesses opening into a central port registering with the channel, means controlling a limited sliding of the dished members and of the intermediate plate away from the second plate in succession starting with the recessed member furthest away from the injection port out of their relative nested position to release the sections molded therein when the plates are spaced apart and means adapted to urge the sections of the article molded in the successive recesses out of said recesses, starting with the recesses between the second plate and adjacent member.

5. A mold for molding complex articles made of plastic material and including a stack of superposed sections including an upstanding cone provided with an axial injection port and radial slots connecting said port with the outer surface of the cone, a second plate provided with a frustoconical depression matching the cone on the first plate and with a channel opening into said depression in registry with the injection port, guiding means along which the second plate is adapted to move towards the first plate along a line parallel with said channel between a spaced position with reference to the first plate and a position for which a narrow gap is left between the cone on the first plate and the frustoconical recess in the second plate, a stack of dished members carried by the second plate in stack formation on the side facing the first plate and adapted to slide with reference to the latter along a line parallel with the channel into a nested position with reference to each other and to the first plate, any couple of successive members including the movable plate defining between them in their nested position closed recesses opening into a central port registering with the gap, to provide a passage for the injected material out of the injection port into said closed recesses, means controlling a limited sliding of the dished members away from each other in succession starting with that furthest away from the injection port out of their relative nested position to release the sections molded therein when the plates are spaced apart and means adapted to urge the sections of the article molded in the successive recesses and said gap out of said recesses, starting with the recesses between the second plate and adjacent member.

6. A mold for molding complex articles made of plastic material and including a stack of superposed sections arranged in tiers, comprising a first stationary plate provided with an injection port, a second plate provided with a channel registering with the injection port, guiding means along which the second plate is adapted to move towards the first plate along a line parallel with said channel, an intermediate centrally open plate adapted to move between the first and second plate in a direction parallel with the channel and including a transverse element facing the second plate to enter transiently an injection position, a plurality of superposed members carried between the second and intermediate plates and adapted to slide with reference to the latter along a line parallel with the channel into a nested position with reference to each other and to the plates, any couple of successive members including the movable and intermediate plates defining between them in their nested position closed recesses opening into a central port registering with the channel, to provide a passage for the injected material out of the injection port into said closed recesses, means controlling a limited sliding of the said members away from the second plate in succession starting with that furthest away from the injection port out of their relative nested position to release the sections molded therein when the plates are spaced apart and means adapted to urge the sections of the article molded in the successive recesses out of said recesses, starting with the recesses between the second plate and adjacent member.

7. A mold for molding complex articles made of plastic material and including a stack of superposed sections arranged in tiers, comprising a first stationary plate provided with an injection port, a second plate provided with a channel registering with the injection port, guiding means along which the second plate is adapted to move towards the first plate along a line parallel with said channel to enter transiently an injection position, a plurality of superposed members carried by the second plate in stack formation on the side facing the first plate and adapted to slide with reference to the latter along a line parallel with the channel into a nested position with reference to each other and to the first plate, any couple of successive members including the movable plate defining between them in their nested position closed recesses opening into a central port registering with the channel, to provide a passage for the injected material out of the injection port into said closed recesses, bolts including each a head engaging the surfaces of the corresponding recessed member facing the first plate and the shanks of which extend through said corresponding member and the members lying between the latter and the second plate and also through the latter, nuts screwed over the bolts beyond said second plate to allow a limited sliding movement of the superposed recessed members away from the second plate in succession starting with that nearest said second plate out of their relative nested position, to release the sections molded therein when the plates are spaced apart and means adapted to urge the sections of the article molded in the successive recesses out of said recesses, starting with the recesses between the second plate and adjacent member.

References Cited
UNITED STATES PATENTS

| | | | |
|---|---|---|---|
| 1,321,517 | 11/1919 | Frederick. | |
| 2,420,813 | 5/1947 | Camerota | 18—16 |
| 2,596,602 | 5/1952 | Roddenberry | 18—16 X |
| 2,985,915 | 5/1961 | Winstead | 18—19 |
| 3,004,291 | 10/1961 | Schad | 18—42 |
| 3,173,177 | 3/1965 | Rybka. | |

WILLIAM J. STEPHENSON, *Primary Examiner.*